July 21, 1942.  A. F. SCHUMANN  2,290,770
COMBUSTION CONTROL APPARATUS
Filed Dec. 23, 1938  3 Sheets-Sheet 3
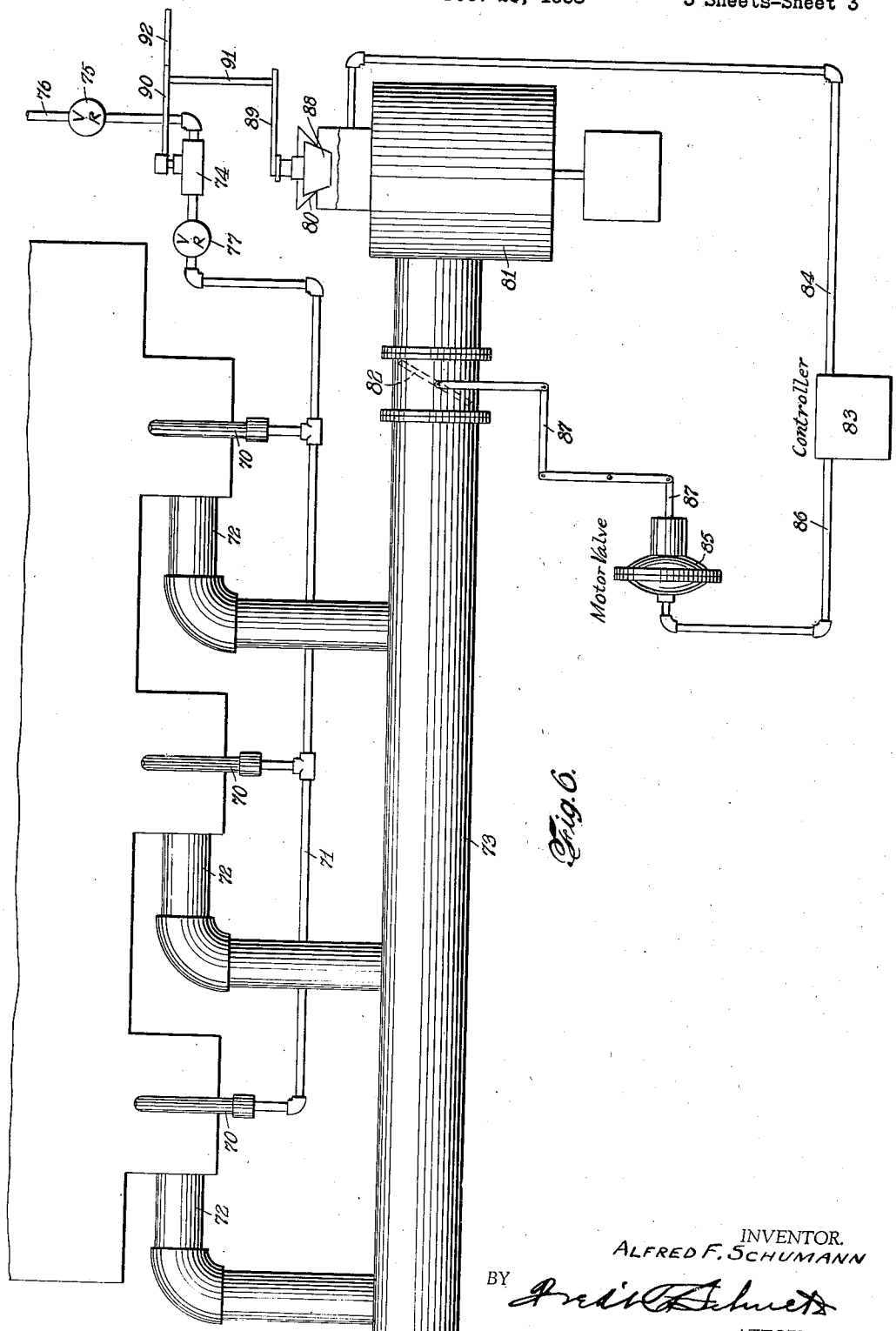
INVENTOR.
ALFRED F. SCHUMANN
BY
ATTORNEY.

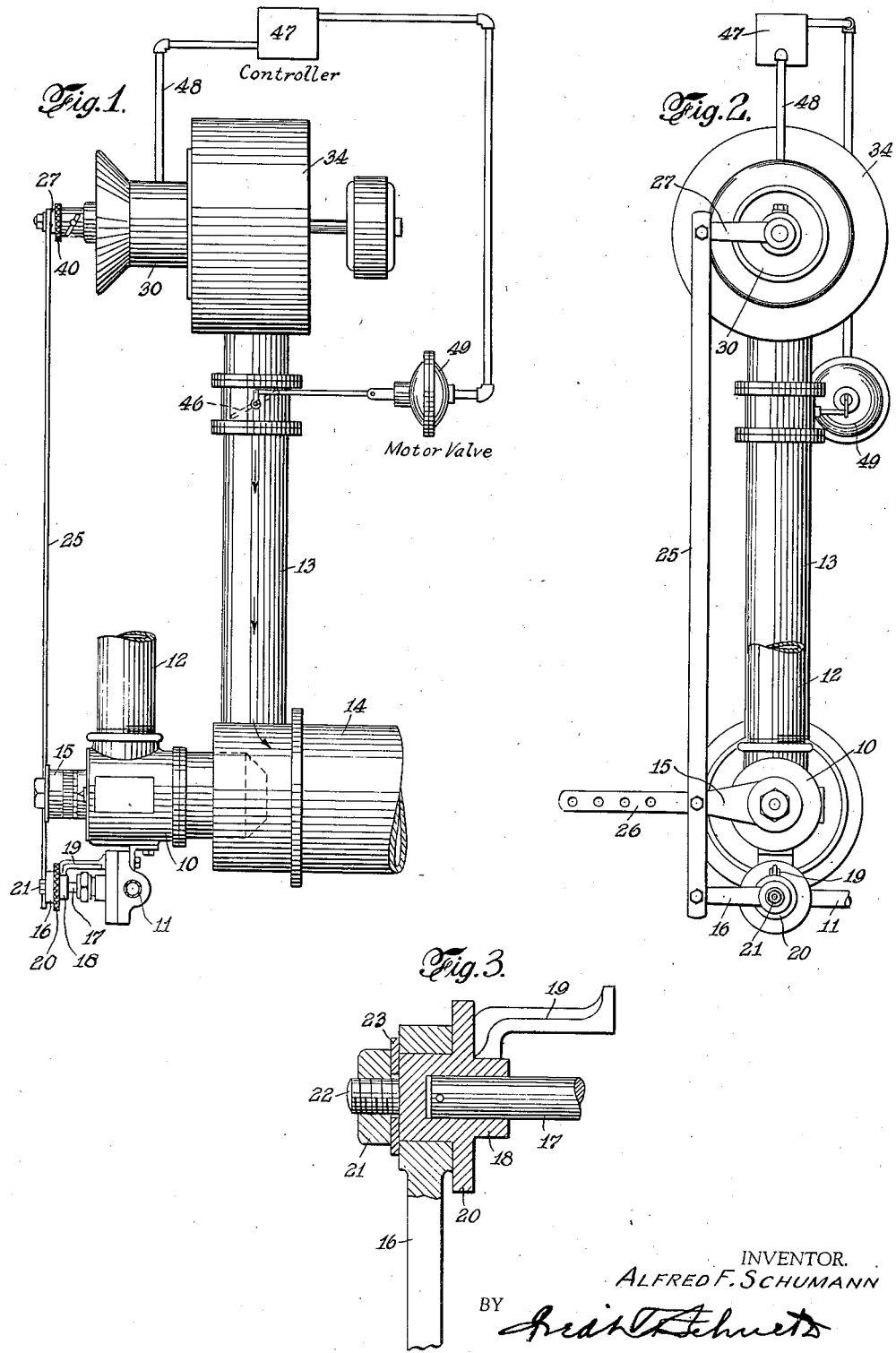

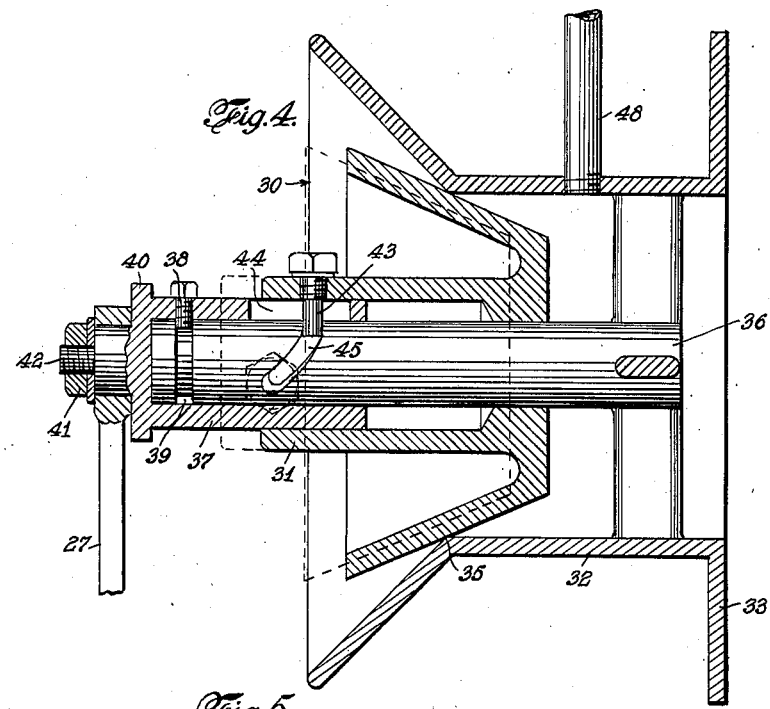
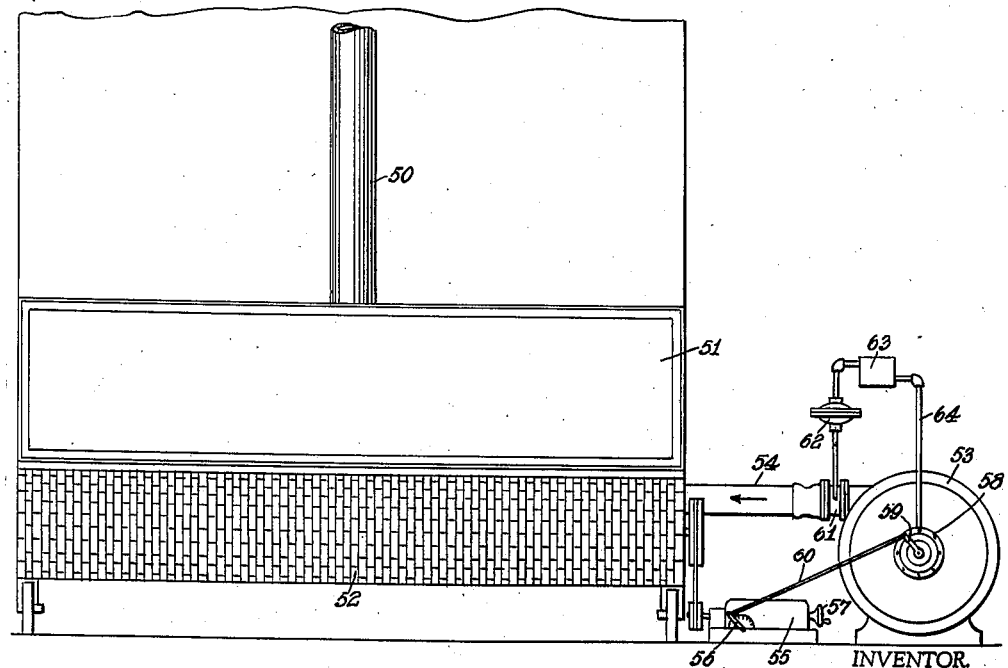

Patented July 21, 1942

2,290,770

UNITED STATES PATENT OFFICE 2,290,770

COMBUSTION CONTROL APPARATUS

Alfred F. Schumann, Baltimore, Md., assignor to Hauck Manufacturing Company, Brooklyn, N. Y., a corporation of New York Application December 23, 1938, Serial No. 247,325

2 Claims. (Cl. 230—114)

The invention relates to combustion apparatus, and more especially to a control system therefor whereby the operation of the apparatus is in a manner such that various load requirements are met without disturbing a predetermined proportional relationship between the fuel to be consumed and the air supplied for the combustion of the fuel; also, such as to maintain the supply of said combustion air constant irrespective of variations in back pressure upon the discharge for use.

The invention has for an object the provision of regulating and control means whereby it is possible to vary simultaneously and readily the supply of both fuel and combustion air, and in such a manner, moreover, that there will be maintained always the desired, and preferably constant, proportional relationship between the two.

A further object of the invention is to maintain a constant differential pressure across an intake valve for the combustion air as the same is supplied to the fuel-consuming means under different load conditions, as well as to maintain automatically such differential under conditions of variable barometric pressure or variable back pressure upon the combustion air as discharged for use and as may result, for example, when said air is first preheated as in passing through a checker work preheater, or as a result of the resistance offered by the choking of a fuel bed and/or a boiler structure, etc.

Another object of the invention is to provide a novel combination of control and regulating means whereby to accomplish the aforesaid results.

In carrying out the invention, suitable fuel-consuming means or burner apparatus is provided for burning fuel such as coal or coke and either solid or powdered and oil and/or gas. In the case of liquid fuels, provision is made for atomizing the same either mechanically or by air or steam under the required pressure; and the volume of the fuel is arranged to be varied in well-known manner to meet the load requirements. For the combustion of the fuel, additional or combustion air is arranged to be supplied in the requisite quantities by suitable means regulating its supply.

In accordance with the invention, provision is made whereby this supply of combustion air is to be maintained in predetermined proportional relationship to the fuel supplied; and to this end means are provided whereby the differential pressure across an intake valve of the combustion-air supply line is maintained constant. For example, the intake valve comprises an element which is movable to vary the port area of the valve in regulating the supply of combustion air; and there is connected with said valve means such as a constant-speed fan or the like for advancing the air to the point of consumption, or the valve may be connected with means for inducing a flow thereto. A pressure-responsive controller means is arranged for association with the combustion air supply system in a manner such as to be responsive to the pressure prevailing in the connection between the said intake valve and the fan, i. e. on the intake side of the latter. This controller means, in turn, controls a motor such as a pressure-operated motor valve; and the latter is connected with flow controlling means such as a butterfly valve located in the discharge connection from the fan.

The arrangement is such that, for example, as the degree of vacuum increases temporarily at the intake side of the fan, due to increased demand, the said butterfly valve will be operated to restrict or check the discharge flow from said fan. This will effect an increase in the discharge pressure and will restore the fan inlet pressure or pressure prevailing in the connection between the valve and fan. There is thus maintained substantially constant the pressure across said intake valve, i. e. between the pressure of the air external its movable element and the pressure on the other side of said element or the intake side of the fan, notwithstanding the fact that the movable element is moved to vary the port area for regulation of the supply. Or in the event of a change in the back pressure on the discharge air, such change will be reflected in a corresponding change in the pressure of the air on the intake side of the fan, and the latter change will affect immediately the controller means to set the butterfly valve to a position to restore the differential across the intake valve whose port area, it is understood, has not been altered in this instance. Thus, any such change in back pressure will be accommodated, and the constant supply of the combustion air will not have been disturbed.

For regulating the volume of air such that its volume shall be directly proportional to the port opening area, provision is made to move or reciprocate the valve element, for example, through the action of an oscillatable lever which is coupled to a similar lever control for the fuel regulating means so that both shall move together and, preferably, for an equal amount as when a predetermined constant relationship is to be maintained between the supplies.

Adjustment means for this valve element are also afforded so that the initial desired relationship between the fuel supply and the combustion air supply may readily be secured; and this relationship by the means hereinbefore noted will then be maintained constant, or may be varied according to a predetermined plan, throughout the operation of the fuel-consuming apparatus.

The nature of the invention, however, will best be understood when described in connection with the accompanying drawings, in which:

Fig. 1 is a more or less diagrammatic representation illustrating a liquid fuel burning system embodying the novel control.

Fig. 2 is a fragmentary side view thereof.

Fig. 3 is a fragmentary longitudinal section of the adjustment means for the fuel supply.

Fig. 4 is a longitudinal section of an intake valve utilized in the system.

Fig. 5 is an end elevation, more or less diagrammatic, illustrating the invention as applied to burner apparatus for solid fuel.

Fig. 6 is a more or less diagrammatic representation illustrating the invention as embodied in a multiple burner installation of the mechanical atomizer type.

Referring to the drawings, more particularly Figs. 1–3, 10 designates fuel-consuming apparatus shown in the particular embodiment as a proportional oil or liquid fuel burner, the fuel being supplied through a suitable conducting pipe 11 and air or steam for atomizing the same through the supply pipe 12. This burner may be of any well known or special design, for example, of the nature of that set forth in my copending application Serial No. 130,420, filed March 11, 1937. The purpose of this burner apparatus is to supply properly atomized liquid fuel for combustion either directly at the burner through admixture of additional and combustion air therewith from the discharge pipe 13, or at some point remote therefrom through delivery of the mixture by means of the duct 14 into which both the burner 10 and the discharge pipe 13 discharge.

Provision is made for regulating the feed, both of the fuel and of the atomizing air therefor, for example, in the manner set forth in my said application as in providing lever arms 15 and 16 connected respectively with control means (not shown) for the atomizing air and for the fuel. Provision is further made, in the case of the latter supply, for an initial setting or adjustment as by means of an adjustable connection between the lever arm 16 and a spindle 17 for adjusting the fuel through rotation of said spindle. The latter, reference being had to Fig. 3 of the drawings, is fixed at its outer end to a cylinder 18 rotatably mounted in a bracket 19 of the burner, said cylinder having a knurled flange 20 for convenient manipulation in effecting the adjustment. Cylinder 18 is arranged to be locked to the lever arm 16 as through a nut 21 fitting over a threaded stem 22 projecting axially from the outer end of the cylinder, there being interposed a spring washer 23 between said nut and the cylinder. Thus, when the desired adjustment has been made, arm 16 may be rigidly secured to the cylinder by suitably tightening the nut 21.

The two arms 15 and 16 are connected together by means of a link 25 and at equal radial distances so that corresponding angular movement may be imparted to the respective regulating means for the atomizing air and for the fuel; and one of the arms, as the arm 15, may be extended to provide an operating handle 26 which will be manipulated in well-known manner to conform a supply of fuel to the demand.

In accordance with the invention, provision is made also for conforming the combustion air to the change in fuel in a particularly simple and effective manner and simultaneously with the regulation of the atomizing air and fuel. To this end, link 25 connects also with an arm 27 of an intake valve 30 controlling the intake of combustion air, the connection being such that, preferably, the various arms are of equal operating radii. Reference being had to Fig. 4 of the drawings, this valve may consist, as shown, of a movable valve element 31 axially reciprocable in a cylindrical body 32 with flaring mouth at the intake end and flange 33 at the opposite end for connection to suitable air-advancing means as, for example, the motor-driven fan 34. Provision is made, also, as in the case of the fuel supply, for adjusting or initially setting the valve-piece 31 with reference to its seat 35 to thus vary the port area. To this end, valve-piece 31 is rotatable on an axial spindle 36 fixed to the casing. A bushing 37 is fitted about the spindle 36 by pin 38 fitting a circular groove 39 of the said spindle, and the bushing has at its outer end a knurled flange 40 for adjustment relatively to the operating arm 27 which fits over the end of said bushing and which is frictionally held thereto by a nut 41 fitting over the threaded stem 42 of the bushing. As the bushing is turned by angular movement of the arm 27, a pin 43 carried by the valve element 31 and passing through a slot 44 of the bushing engages a helical groove 45 of spindle 36, serving thereby to advance or retract the said valve element from or toward the valve seat 35 in accordance with the particular direction of movement of said arm. The position shown in the dotted lines indicates the limit of outward movement of the valve piece to afford maximum port area, while the position shown in the full lines indicates its shut-off location.

As the load requirements change, the fan 34, which is preferably of the constant-speed motor-driven type, will be required to deliver more or less combustion air within its capacity, the valve 30 being regulated accordingly through manipulation of handle 26, as hereinbefore set forth. The corresponding change in port area would, therefore, ordinarily produce a different absolute intake pressure at the fan, the external presure being atmospheric as a rule. Such change in pressure differential across the intake valve would not afford a straight-line variation so as to conform properly to the variation in the fuel supply. Provision is therefore made whereby this differential pressure will be maintained constant irrespective of the port area so that the volume changes effected in the regulation of the valve will be accomplished under constant pressure conditions, and the predetermined proportion between the fuel and the combustion air supplies will be automatically maintained. The burner apparatus for the fuel and the air-supplying means are of such a nature that the flow curves of the various fluids passing therethrough are characterized by being straight lines, that is to say, the respective orifice areas vary directly in accordance with the simultaneous angular adjustment of the burner apparatus and the air-supplying means while maintaining a constant pressure drop across such orifices. These orifice areas may be altered as represented by a raising or lowering of the flow curves thereof, by the adjustments heretofore described, for the purpose of varying the character of the flame so as to render it of a reducing or of an oxidizing nature.

For this purpose, there is introduced in the discharge pipe 13 means such as a butterfly valve 46 for regulating the pressure of the air discharged by the fan 34; and this valve 46 is controlled in accordance with the temporary variations in the pressure on the intake side of the fan if and when the volume of combustion air is changed by actuation of the intake valve, as well as in the case of a change in the back pressure on the air as discharged by the fan, or with change in the barometric pressure. Thus, a controller means 47, for example of the pneumatic type set forth in U. S. Letters Patent #1,880,247, is associated with the system and is made responsive to the intake pressure as by being connected through pipe 48 to the interior of cylinder 32. This controller, in turn, controls a suitable motor means 49, for example, a fluid-pressure-operated diaphragm valve of any well-known type. The movable spindle of this valve is connected by suitable means to the butterfly valve 46 for actuating the same.

In Fig. 5 a different form of combustion apparatus is set forth, the fuel in this embodiment being of the solid type such as coal or coke and designed to be fed in the usual manner through a chute 50 into a supply hopper 51 from which it is fed upon a chain-grate stoker 52, all of which is well understood and forms no part of the present invention. Combustion air for the furnace is supplied from a blower 53, similar to the motor-driven fan 34, and through a duct or discharge pipe 54 connected to the furnace. The chain-grate 52 is driven in well-known manner from a motor or the like (not shown) through a variable speed drive 55 such as the well-known "Reeves" drive and having an arm 56 which will rock as the hand wheel 57 of the drive mechanism is manipulated to vary the speed of the chain-grate in accordance with the demand of the furnace.

The blower 53, however, is provided with an intake valve 58 similar to the valve 30 hereinbefore described; and this valve, through an arm 59, is arranged to be operated simultaneously with the arm 56 of the variable-speed drive mechanism, the two arms being connected by a link 60 and preferably at equal radii to maintain a predetermined ratio in the regulation, as in the previously described embodiment. As in the said embodiment, a butterfly valve 61 is provided in the discharge pipe 54 and is under the regulation of a motor-valve 62 which, in turn, is controlled by the controller 63 connected to the intake valve 58 by pipe 64. The operation of this system is precisely the same as the system utilizing liquid or gaseous fuel; and as there is no need for a supply of atomizing medium, the corresponding mechanism for this supply has therefore been dispensed with.

In Fig. 6 the invention is set forth as applied to a multiple burner installation wherein a plurality of burners 70 are provided and fed with fuel through a header 71, common thereto. These burners have also been indicated as of the well-known mechanical atomizing type wherein the fuel is directed under substantial pressure through an orifice of fixed dimension; and there is associated with each of the said burners combustion air supplying pipes 72 fed from a duct 73 common thereto. Fuel is fed to the header 71 through a controlling valve 74 across which there is maintained a predetermined pressure drop, for example, by the interposition of a pressure-regulating valve 75 in the supply pipe 76 to the valve 74 and a pressure-regulating valve 77 in the header 71, all of which is well known and forms no particular part of the invention.

Provision is made, however, for controlling the supply of combustion air in a manner similar to that described in connection with the previously set forth embodiments of the invention. Thus, an intake valve 80 is connected with a fan 81 supplying the combustion air to the duct 73; and a butterfly valve 82 is introduced into the said duct beyond the said fan. A controller 83, responsive to the pressure prevailing at the intake side of the fan as through the connection 84 thereto, operates a motor or diaphragm valve or the like 85 which, as indicated, is of the pressure-control type and is connected with the controller 83 by the pipe 86. Motor valve 85, in turn, operates through a series 87 of levers and links the said butterfly valve 82 to maintain, in the manner hereinbefore described, a predetermined pressure drop across the movable element 88 of valve 80; and this element is designed for adjustment simultaneously with the fuel supply valve 74 through actuation of respective arms 89 and 90 connected together by a link 91 and having an operating handle 92.

I claim:

1. Control apparatus of the nature set forth and comprising a fluid advancing means, together with means in advance thereof for regulating the supply of fluid to the said advancing means therefor, and means subject solely to the pressure of the fluid at the intake side of the advancing means for maintaining a constant differential pressure across the said fluid supply regulating means and including means located in the output of the advancing means for varying the pressure of the fluid discharged thereby.

2. Control apparatus comprising a constant speed fan for advancing fluid, together with an adjustable intake valve in advance thereof for regulating the supply of fluid to the said fan, and means to maintain a predetermined constant pressure drop across said intake valve and comprising controller means responsive to the pressure prevailing between the intake valve and the fan, a motor subject to the controller, and a valve operated thereby and located beyond the fan in close proximity thereto to control the flow of fluid beyond the said fan.

ALFRED F. SCHUMANN.